(12) United States Patent
Michaels et al.

(10) Patent No.: US 11,435,454 B2
(45) Date of Patent: Sep. 6, 2022

(54) BEAM WALKOFF MITIGATION FOR LIGHT DETECTION AND RANGING

(71) Applicant: OURS Technology, LLC, Mountain View, CA (US)

(72) Inventors: Andrew Steil Michaels, Santa Clara, CA (US); Sen Lin, Santa Clara, CA (US)

(73) Assignee: OURS Technology, LLC, Mountain View, CA (US)

( * ) Notice: Subject to any disclaimer, the term of this patent is extended or adjusted under 35 U.S.C. 154(b) by 0 days.

(21) Appl. No.: 17/463,934

(22) Filed: Sep. 1, 2021

(65) Prior Publication Data

US 2022/0075044 A1    Mar. 10, 2022

Related U.S. Application Data

(60) Provisional application No. 63/074,837, filed on Sep. 4, 2020, provisional application No. 63/074,834, filed on Sep. 4, 2020.

(51) Int. Cl.
*G01S 7/4912* (2020.01)
*G01S 7/4861* (2020.01)
(Continued)

(52) U.S. Cl.
CPC .......... *G01S 7/4916* (2013.01); *G01S 7/4817* (2013.01); *G01S 7/4861* (2013.01); *G01S 7/499* (2013.01); *G01S 17/32* (2013.01); *G01S 17/34* (2020.01); *G01S 17/931* (2020.01); *B60W 60/001* (2020.02); *B60W 2420/52* (2013.01)

(58) Field of Classification Search
CPC ....... G01S 7/4916; G01S 7/4861; G01S 17/34
See application file for complete search history.

(56) References Cited

U.S. PATENT DOCUMENTS

| 10,754,091 B1 | 8/2020 | Nagarajan |
| 17,463,860 | 9/2021 | Michaels |

(Continued)

FOREIGN PATENT DOCUMENTS

| EP | 1640747 A1 * | 3/2006 | ............... G01S 7/48 |
| WO | 2019084610 A1 | 5/2019 | |

(Continued)

OTHER PUBLICATIONS

NPL1 (Sensing with Polarized LIDAR in Degraded Visibility Conditions Due to Fog and Low Clouds) (Year: 2021).*

(Continued)

*Primary Examiner* — Luke D Ratcliffe
*Assistant Examiner* — Sanjida Naser
(74) *Attorney, Agent, or Firm* — Freestone Intellectual Property Law PLLC; Aaron J. Visbeek; Andrew J. Cameron

(57) ABSTRACT

A light detection and ranging (LIDAR) system includes a first receive optical coupler, a second receive optical coupler, a first optical mixer, a second optical mixer, and an optical switch. The first optical mixer is configured to receive a first receive signal from the first receive optical coupler. The second optical mixer is configured to receive a second receive signal from the second receive optical coupler. The optical switch is configured to switch an oscillator light signal between the first optical mixer and the second optical mixer.

20 Claims, 11 Drawing Sheets

(51) Int. Cl.
  *G01S 17/34*  (2020.01)
  *G01S 17/931* (2020.01)
  *G01S 7/481*  (2006.01)
  *G01S 7/499*  (2006.01)
  *G01S 17/32*  (2020.01)
  *B60W 60/00*  (2020.01)

(56) References Cited

U.S. PATENT DOCUMENTS

| | | | |
|---|---|---|---|
| 2018/0356528 A1* | 12/2018 | Schaffner | G01S 17/58 |
| 2019/0049985 A1 | 2/2019 | Doylend | |
| 2019/0391243 A1 | 12/2019 | Nicolaescu | |
| 2020/0018854 A1* | 1/2020 | Hicks | G01S 17/42 |
| 2020/0103502 A1 | 4/2020 | Talty et al. | |
| 2020/0150241 A1 | 5/2020 | Byrnes et al. | |
| 2020/0256960 A1 | 8/2020 | LaChapelle et al. | |
| 2020/0333533 A1* | 10/2020 | Rogers | G01S 7/4811 |
| 2021/0112647 A1 | 4/2021 | Coleman | |

FOREIGN PATENT DOCUMENTS

| | | | |
|---|---|---|---|
| WO | 2020161250 A1 | 8/2020 |
| WO | 2020219145 A1 | 10/2020 |

OTHER PUBLICATIONS

U.S. Appl. No. 17/343,511, Unknown, OURS Technology, LLC.

International Searching Authority, Patent Cooperation Treaty, Written Opinion of the International Searching Authority, International Application No. PCT/US2021/048924, dated Dec. 7, 2021, 11 pages.

International Searching Authority, Patent Cooperation Treaty, Written Opinion of the International Searching Authority, International Application No. PCT/US2021/048925, dated Dec. 14, 2021, 12 pages.

Non-Final Office Action, U.S. Appl. No. 17/463,860, dated Sep. 1, 2021, 9 pages.

Final Office Action, U.S. Appl. No. 17/463,860, dated May 10, 2022, 10 pages.

\* cited by examiner

BEAM WALKOFF MITIGATION FOR LIGHT DETECTION AND RANGING

CROSS-REFERENCE TO RELATED APPLICATIONS

This application claims priority to U.S. provisional Application No. 63/074,834 filed Sep. 4, 2020, and U.S. provisional Application No. 63/074,837 filed Sep. 4, 2020, which are hereby incorporated by reference.

TECHNICAL FIELD

This disclosure relates generally to optics and in particular to light detection and ranging (LIDAR).

BACKGROUND INFORMATION

Frequency Modulated Continuous Wave (FMCW) LIDAR directly measures range and velocity of an object by directing a frequency modulated, collimated light beam at a target. Both range and velocity information of the target can be derived from FMCW LIDAR signals. Designs and techniques to increase the accuracy of LIDAR signals are desirable.

The automobile industry is currently developing autonomous features for controlling vehicles under certain circumstances. According to SAE International standard J3016, there are 6 levels of autonomy ranging from Level 0 (no autonomy) up to Level 5 (vehicle capable of operation without operator input in all conditions). A vehicle with autonomous features utilizes sensors to sense the environment that the vehicle navigates through. Acquiring and processing data from the sensors allows the vehicle to navigate through its environment. Autonomous vehicles may include one or more FMCW LIDAR devices for sensing its environment.

BRIEF SUMMARY OF THE INVENTION

Implementations of the disclosure includes a light detection and ranging (LIDAR) system including a first receive optical coupler, a second receive optical coupler, a first optical mixer, a second optical mixer, and an optical switch. The first optical mixer is configured to receive a first receive signal from the first receive optical coupler. The second optical mixer is configured to receive a second receive signal from the second receive optical coupler. The optical switch is configured to switch an oscillator light signal between the first optical mixer and the second optical mixer. The first optical mixer is configured to generate a first electrical signal in response to receiving the oscillator light signal and the first receive signal. The second optical mixer is configured to generate a second electrical signal in response to receiving the oscillator light signal and the second receive signal.

In an implementation, the LIDAR system further includes a rotating mirror configured to rotate in a first direction when the optical switch is switched to provide the oscillator light signal to the first optical mixer. The rotating mirror may be configured to rotate in a second direction when the optical switch is switched to provide the oscillator light signal to the second optical mixer. The first direction may be opposite of the second direction.

In an implementation, the LIDAR system further includes processing logic configured to receive a first electrical signal from the first optical mixer when the optical switch is switched to provide the oscillator light signal to the first optical mixer. The processing logic is also configured receive a second electrical signal from the second optical mixer when the optical switch is switched to provide the oscillator light signal to the second optical mixer.

In an implementation, the rotating mirror is configured to direct a returning beam to the first receive optical coupler when the rotating mirror is rotating in the first direction. The rotating mirror is also configured to direct the returning beam to the second receive optical coupler when the rotating mirror is rotating in the second direction.

In an implementation, the LIDAR system further includes a transmit optical coupler disposed between the first receive optical coupler and the second receive optical coupler.

In an implementation, the first receive optical coupler is orthogonal to the transmit optical coupler and the second receive optical coupler is orthogonal to the transmit optical coupler.

In an implementation, the transmit optical coupler is configured to emit a transmit beam having a first polarization orientation and the first receive optical coupler is configured to receive a second polarization orientation that is orthogonal to the first polarization orientation. The second receive optical coupler is also configured to receive the second polarization orientation.

In an implementation, the LIDAR system further includes a splitter configured to receive laser light where the splitter is configured to provide a first percentage of the laser light to the transmit optical coupler. The splitter is configured to provide a second percentage of the laser light to the optical switch.

In an implementation, the laser light has an infrared wavelength.

Implementations of the disclosure include a method of operating a light detection and ranging (LIDAR) device. The method includes: driving an optical switch to provide an oscillator light signal to a first optical mixer when a rotating mirror is rotating in a first direction; sampling a first signal generated by the first optical mixer while the first optical mixer is receiving the oscillator light signal; driving the optical switch to provide the oscillator light signal to a second optical mixer when the rotating mirror is rotating in a second direction that is opposite the first direction; and sampling a second signal generated by the second optical mixer while the second optical mixer is receiving the oscillator light signal.

In an implementation, the first signal is generated in response to the oscillator light signal and a first receive signal generated by a first receive optical coupler. The second signal is generated in response to the oscillator light signal and a second receive signal generated by a second receive optical coupler.

In an implementation, the rotating mirror is configured to direct a returning beam to the first receive optical coupler and the rotating mirror is configured to direct the returning beam to the second receive optical coupler.

In an implementation, the rotating mirror is further configured to direct a transmit beam from a transmit optical coupler to a target and the returning beam is the transmit beam reflecting off of the target.

In an implementation, the transmit optical coupler is disposed between the first receive optical coupler and the second receive optical coupler.

In an implementation, the transmit optical coupler is configured to emit the transmit beam having a first polarization orientation and the first receive optical coupler is configured to receive a second polarization orientation that is orthogonal to the first polarization orientation. The second receive optical coupler is also configured to receive the second polarization orientation.

In an implementation, the oscillator light signal has an infrared wavelength and the first receive signal and the second receive signal have the infrared wavelength.

Implementations of the disclosure include an autonomous vehicle control system for an autonomous vehicle including a light detection and ranging (LIDAR) device and one or more processors configured to control the autonomous vehicle in response to a first electrical signal and a second electrical signal generated by the LIDAR device. The LIDAR device includes a first receive optical coupler, a second receive optical coupler, a first optical mixer, a second optical mixer, and an optical switch. The first optical mixer is configured to receive a first receive signal from the first receive optical coupler. The second optical mixer is configured to receive a second receive signal from the second receive optical coupler. The optical switch is configured to switch an oscillator light signal between the first optical mixer and the second optical mixer. The first optical mixer is configured to generate a first electrical signal in response to receiving the oscillator light signal and the first receive signal. The second optical mixer is configured to generate a second electrical signal in response to receiving the oscillator light signal and the second receive signal.

In an implementation, the LIDAR device further includes a rotating mirror configured to rotate in a first direction when the optical switch is switched to provide the oscillator light signal to the first optical mixer. The rotating mirror is configured to rotate in a second direction when the optical switch is switched to provide the oscillator light signal to the second optical mixer. The first direction is opposite of the second direction.

In an implementation, the LIDAR device further includes processing logic configured to receive a first electrical signal from the first optical mixer when the optical switch is switched to provide the oscillator light signal to the first optical mixer. The processing logic is also configured receive a second electrical signal from the second optical mixer when the optical switch is switched to provide the oscillator light signal to the second optical mixer.

In an implementation, the rotating mirror is configured to direct a returning beam to the first receive optical coupler and the rotating mirror is configured to direct the returning beam to the second receive optical coupler.

BRIEF DESCRIPTION OF THE DRAWINGS

Non-limiting and non-exhaustive implementations of the invention are described with reference to the following figures, wherein like reference numerals refer to like parts throughout the various views unless otherwise specified

DETAILED DESCRIPTION

Figure 1:
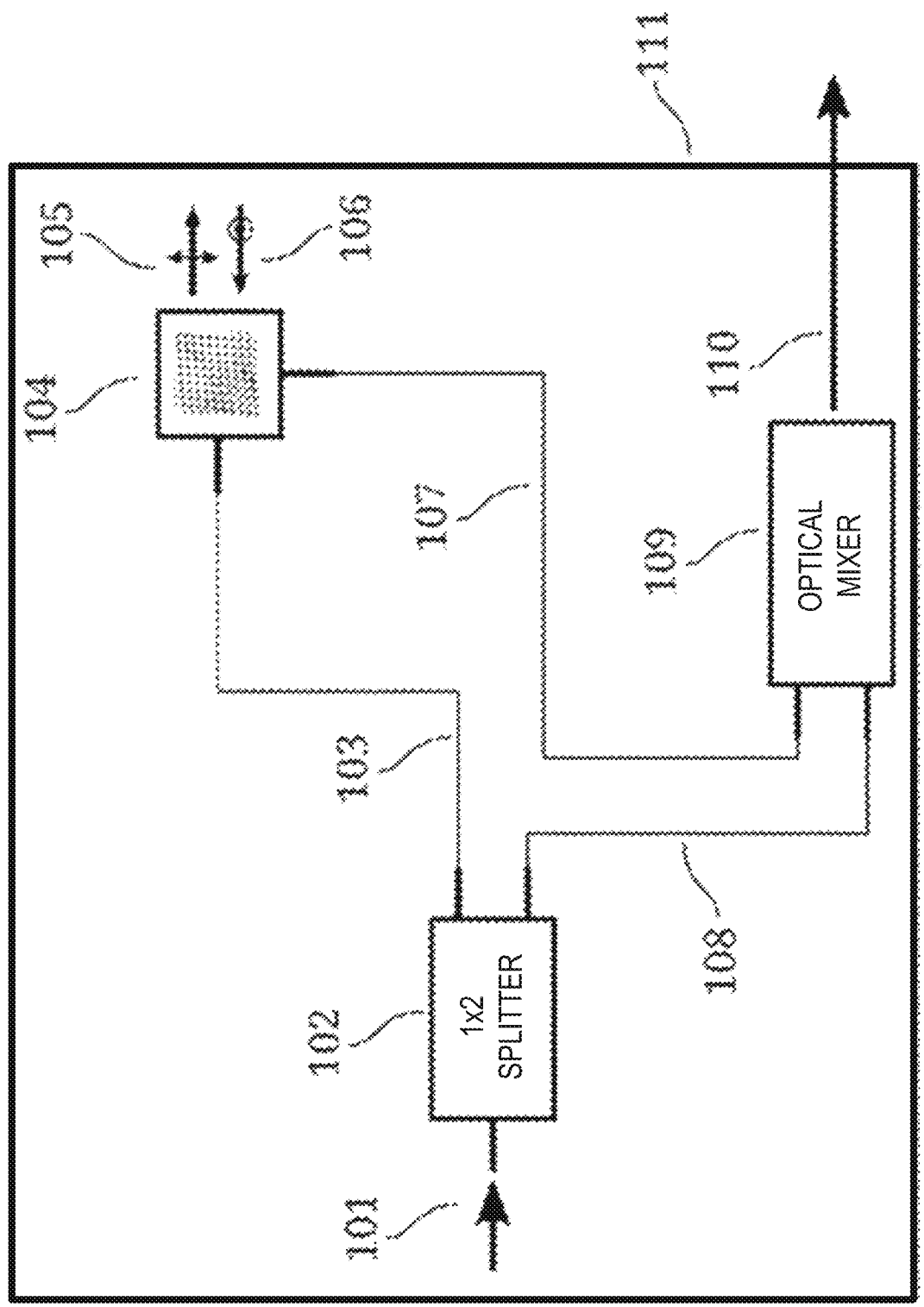
FIG. 1 illustrates a diagram of an implementation of a pixel of a LIDAR device, in accordance with implementations of the disclosure.

Implementations of beam walkoff mitigation for LIDAR are described herein. In the following description, numerous specific details are set forth to provide a thorough understanding of the implementations. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

Throughout this specification, several terms of art are used. These terms are to take on their ordinary meaning in the art from which they come, unless specifically defined herein or the context of their use would clearly suggest otherwise. For the purposes of this disclosure, the term "autonomous vehicle" includes vehicles with autonomous features at any level of autonomy of the SAE International standard J3016.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 µm.

In aspects of this disclosure, the term "transparent" may be defined as having greater than 90% transmission of light. In some aspects, the term "transparent" may be defined as a material having greater than 90% transmission of visible light.

Frequency Modulated Continuous Wave (FMCW) LIDAR directly measures range and velocity of an object by directing a frequency modulated, collimated light beam at the object. The light that is reflected from the object is combined with a tapped version of the beam. The frequency of the resulting beat tone is proportional to the distance of the object from the LIDAR system once corrected for the doppler shift that requires a second measurement. The two measurements, which may or may not be performed at the same time, provide both range and velocity information.

FMCW LIDAR can take advantage of integrated photonics for improved manufacturability and performance. Integrated photonic systems typically manipulate single optical modes using micron-scale waveguiding devices.

A LIDAR system may include of one or more continuously moving mirrors which steer the outgoing light towards a target at range and reflect the received light from that target into a receiver. Due to the transit time for light moving from the LIDAR to a target and back, the continuous motion of the mirror causes the received light to move away from the few-micron-sized transceiver. This "beam walkoff" effect can lead to a reduction in system performance.

A conventional integrated implementation of FMCW LIDAR involves co-locating the transmitter and receiver. This, however, may lead to additional loss as the receive optical power must pass back through the LO/signal splitter. In order to increase performance, it may be desirable to separate the transmitter and receiver such that this splitter does not add additional loss to the optical system. In these implementations, the transmitter and receiver are non-co-axial and are spaced apart from each other.

In implementations of the disclosure, a LIDAR system includes a first receive optical coupler, a second receive optical coupler, a first optical mixer, a second optical mixer, and an optical switch. A transmit optical coupler disposed between the first receive optical coupler may emit a near-infrared transmit beam that is directed to a target by a rotating mirror. The transmit beam reflects off a target and returns as a returning beam. When the rotating mirror is rotating in a first direction (e.g. clockwise) beam walkoff may cause the returning beam to be displaced in a first direction so that the returning beam becomes incident on the first receive optical coupler. When the rotating mirror is rotating in a second direction (e.g. counter-clockwise) beam walkoff may cause the returning beam to be displaced in a second direction so that the returning beam becomes incident on the second receive optical coupler. Capturing the returning beam with receive optical couplers that are non-coaxial with the transmit coupler increases the signal of the returning beam. To facilitate capturing the returning beam with two different receive optical couplers, an optical switch may be configured to switch an oscillator light signal between the first optical mixer and the second optical mixer where the first optical mixer is configured to generate a first signal in response to receiving the oscillator light signal and the first receive signal and where the second optical mixer is configured to generate a second signal in response to receiving the oscillator light signal and the second receive signal.

In some aspects of the disclosure, an apparatus is described for correcting beam walkoff in LIDAR applications that include a polarization-diverse coherent pixel and a tilted piece of birefringent material. Light may be emitted from the coherent pixel with polarization A which passes through a birefringent material. As the light passes through the birefringent material, the beam becomes offset relative to the source as a result of refraction. This light leaves the LIDAR system and reflects off of a diffuse surface at some distance from the system. Light reflected off of a diffuse surface may have its polarization randomized. The light in the polarization orthogonal to the emitted polarization (A) propagates back through the birefringent material, which introduces a different displacement to the beam compared to the emitted light. This beam illuminates a polarization-diverse coherent pixel which receives the light. The birefringent material and geometry can be selected to choose a particular set of transmit and receive offsets which mitigate beam walkoff in LIDAR systems. The birefringent material and geometry can also be selected to choose a particular set of transmit and receive offsets which implements non-coaxial transmitters and receivers. These and other implementations are described in more detail in connection with FIGS. 1-8C.

FIG. 1 illustrates a diagram of an implementation of a polarization diverse coherent pixel 111 which can be used in conjunction with a birefringent beam displacer in order to correct for beam walkoff, in accordance with implementations of the disclosure. The illustrated implementation of pixel 111 includes a 1×2 splitter 102, an optical mixer 109, and a dual-polarization grating coupler 104.

Light 101 enters pixel 111 and can be split by a splitter (e.g. 1×2 splitter 102). Light 101 may be infrared laser light generated by a continuous wave (CW) laser. In some implementations, the laser light may be collimated. For example, X % of the light (a first percentage of the light) leaves the splitter in the top interconnect 103 and is routed through dual-polarization grating coupler 104, which may emit first polarized light 105 (e.g. TE-polarized light). The first percentage of the light may be between 70% and 99%, in some implementations. First polarized light 105 may be coupled through a lens and reflected off of a mirror onto a target scene, in some implementations. First polarized light 105 may be uncollimated light and be a diverging beam that is collimated by the lens, in some implementations.

Light 106 returning to the coherent pixel 111 may have a second polarized component 106 (e.g. TM-polarized light) which is coupled back into the coherent pixel 111 by the dual-polarization grating coupler 104. Thus, dual-polarization grating coupler 104 may emit light having a first polarization orientation (e.g. TE-polarized light) and couple the reflected beam (light 106) having the second polarization orientation (e.g. TM-polarized light) into pixel 111. This light coupled into pixel 111 is routed along an interconnect 107 different from the transmit route to an optical mixer 109 which mixes the returning optical field in interconnect 107 with the remaining Y % of the light (a second percentage of the light) that was split off from the 1×2 splitter 102 into the bottom interconnect 108. The second percentage of the light may be between 1% and 30%, in some implementations. The reflected beam (light 106) may be reflected/scattered off a target in an environment of an autonomous vehicle, in some implementations. The output 110 from optical mixer 109 (of which there may be more than one) is processed by a receiver optoelectronic circuit. Hence, optical mixer 109 is configured to generate output 110 by mixing the second percentage of light (Y %) split off by splitter 102 into interconnect 108 with the reflected beam routed along interconnect 107.

Figure 2:
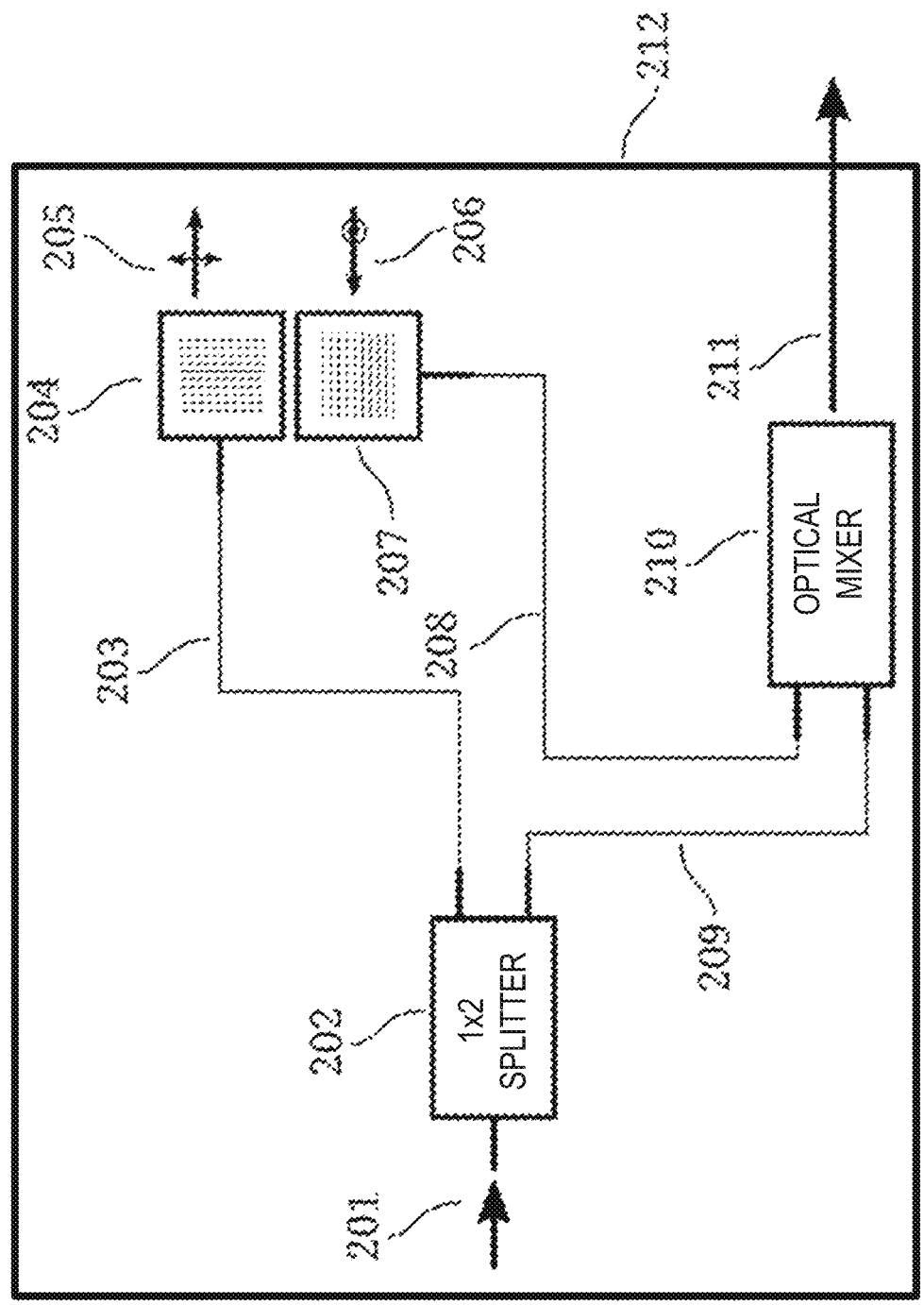
FIG. 2 illustrates a diagram of a pixel of a LIDAR device, in accordance with implementations of the disclosure.

FIG. 2 illustrates a diagram of an implementation of a polarization-diverse coherent pixel 212 of a LIDAR device, in accordance with implementations of the disclosure. Pixel 212 may be used in conjunction with a birefringent beam displacer to correct for beam walkoff. The illustrated implementation of pixel 212 includes a 1×2 splitter 202, an optical mixer 210, a transmitting grating coupler 204, and a single polarization grating coupler 207 oriented perpendicular to transmitting grating coupler 204.

Light 201 enters pixel 212 and can be split by a splitter (e.g. 1×2 splitter 202). Light 201 may be infrared laser light generated by a CW laser. In some implementations, the laser light may be collimated. For example, X % of the light (a first percentage of the light) leaves the splitter in the top interconnect 203 and is routed into a single-polarization grating coupler 204, which emits first polarized light 205 (e.g. TE-polarized light). The first percentage of the light may be between 70% and 99%, in some implementations. First polarized light 205 may be coupled through a lens and reflected off of a mirror onto a target scene. First polarized light 205 may be uncollimated light and be a diverging beam that is collimated by the lens, in some implementations.

Light returning to coherent pixel 212 may have a second polarized component 206 (e.g. TM-polarized component) which is coupled back into the coherent pixel 212 by a single polarization grating coupler 207 which is oriented perpendicular to the transmitting grating coupler 204 such that it receives the orthogonal polarization of light. This light is routed along an interconnect 208 different from the transmit route to an optical mixer 210 which mixes the returning optical field in interconnect 208 with the remaining Y % of the light (a second percentage of the light) that was split off from the 1×2 splitter 202 into the bottom interconnect 209. The second percentage of the light may be between 1% and 30%, in some implementations. The reflected beam (light 206) may be reflected/scattered off a target in an environment of an autonomous vehicle, in some implementations. The output 211 from this mixer 210 (of which there may be more than one) is processed by a receiver optoelectronic circuit. Hence, optical mixer 210 is configured to generate output 211 by mixing the second percentage of light (Y %) split off by splitter 202 into interconnect 209 with the reflected beam routed along interconnect 208.

Figure 3A:
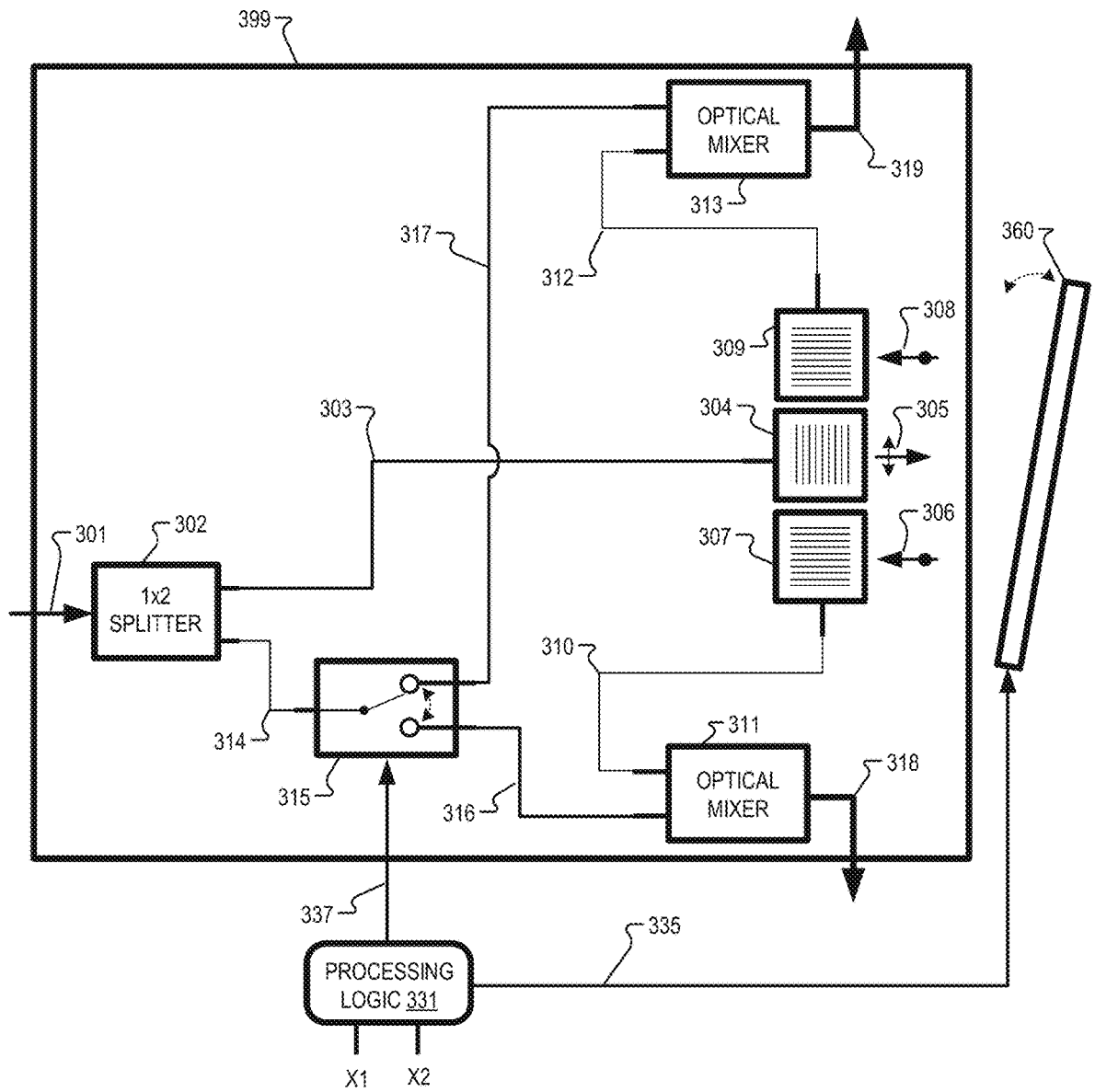
FIG. 3A illustrates a pixel that includes a transmit optical coupler and two receive optical couplers, in accordance with implementations of the disclosure.

FIG. 3A illustrates a pixel 399 that includes a transmit optical coupler and two receive optical couplers, in accordance with implementations of the disclosure. Pixel 399 is a variant of the pixel described in FIG. 2. LIDAR system 300 of FIG. 3A includes pixel 399, processing logic 331, and rotating mirror 360. Pixel 399 includes a 1×2 splitter 302, an optical switch 315, a first optical mixer 313, a second optical mixer 311, a first receive optical coupler 309, a second receive optical coupler 307, and transmit optical coupler 304. Transmit optical coupler 304 is disposed between first receive optical coupler 309 and second receive optical coupler 307. Transmit optical coupler 304 is may be disposed at a midpoint between first receive optical coupler 309 and second receive optical coupler 307, in some implementations.

Transmit optical coupler 304 may be a single polarization grating coupler configured to emit a transmit beam 305 having a first polarization orientation. First receive optical coupler 309 may be a single polarization grating coupler configured to receive a returning beam having second polarization orientation that is orthogonal to the first polarization orientation. Second receive optical coupler 307 may be a single polarization grating coupler configured to receive a returning beam having the second polarization orientation that is orthogonal to the first polarization orientation.

Light 301 enters the pixel 399 and is split by a 1×2 splitter 302. Light 301 may be infrared laser light generated by a CW laser. Light 301 may be near-infrared laser light generated by a CW laser. X % of the light exits the 1×2 splitter 302 in the top interconnect 303 and is routed into a single-polarization grating coupler 304, which emits TE-polarized light as a transmit beam 305, in the illustration of FIG. 3A. In the illustrated implementation, rotating mirror 360 is configured to direct transmit beam 305 to a target in a scene. Transmit beam 305 may propagate through additional optics (not particularly illustrated in FIG. 3A) prior to encountering rotating mirror 360.

Transmit beam 305 may be reflected or scattered by a target and return as a returning beam. Depending on how the returning beam is displaced, it may couple back into pixel 399 through one of two paths. In a first path, the returning beam may have a TM-polarized component 308 which is coupled back into the pixel 399 by a first receive optical coupler 309. First receive optical coupler 309 may be a single polarization grating coupler which is oriented perpendicular to the transmitting grating coupler 304 such that it receives the orthogonal polarization of light. In the second path, the returning beam may have a TM-polarized component 306 which is coupled back into pixel 399 by a second receive optical coupler 307. Second receive optical coupler 307 may be a single polarization grating coupler which is also oriented perpendicular to the transmitting grating coupler 304 such that it receives the orthogonal polarization of light.

The displacement direction of the returning beam may depend on the rotation direction or rotating mirror 360. The displacement is at least partially caused by a different angle of rotating mirror 360 from a time delay between the transmit beam reflecting off of rotating mirror 360 and the returning beam reflecting off of rotating mirror 360. The displacement of the returning beam may also be caused by various optics disposed between pixel 399 and rotating mirror 360. By way of example, when rotating mirror 360 is rotating in a first direction, the returning beam may be displaced to become incident upon first receive optical coupler 309. And when rotating mirror 360 is rotating in a second direction that is opposite the first direction, the returning beam may be displaced to become incident upon second receive optical coupler 307. To account for the returning beam being received with different receive optical couplers, optical switch 315 may be driven to provide oscillator signal (propagating in optical waveguide 314) to different optical mixers that correspond to the receive optical coupler that is receiving the returning beam. In the illustration of FIG. 3A, optical switch 315 is an active optical switch, although, in some implementations, optical switch 315 may be a passive optical switch that does not need to be actively driven.

First optical mixer 313 is configured to receive a first receive signal 312 from first receive optical coupler 309 and second optical mixer 311 is configured to receive a second receive signal 310 from second receive optical coupler 307. Optical switch 315 is configured to switch the oscillator light signal (received from splitter 302 in optical interconnect 314) between first optical mixer 313 and the second optical mixer 311. In the example implementation, processing logic 331 drives a switching signal 337 onto optical switch 315 to control the switching of the oscillator light signal between first optical mixer 313 and second optical mixer 311. First optical mixer 313 is configured to receive the oscillator light signal from optical switch 315. Second optical mixer 311 is also configured to receive the oscillator light signal from optical switch 315. First optical mixer is configured to generate a first electrical signal 319 in response to receiving the oscillator light signal and the first receive signal 312 received from first receive optical coupler 309. Second optical mixer 311 is configured to generate a second electrical signal 318 in response to receiving the oscillator light signal and the second receive signal 310 received from second receive optical coupler 307.

In some implementations, rotating mirror 360 is configured to rotate in a first direction (e.g. clockwise) when optical switch 315 is switched to provide the oscillator light signal to first optical mixer 313. In FIG. 3A, processing logic 331 may drive switching signal 337 to drive optical switch 315 to provide the oscillator light signal to first optical mixer 313 when driving rotating signal 335 to rotate rotating mirror 360 in the first direction since the beam walkoff of the returning beam will be displaced toward first receive optical coupler 309 when rotating mirror 360 is rotated in the first direction. Rotating mirror 360 may also be configured to rotate in a second direction (e.g. counter-clockwise) when optical switch 315 is switched to provide the oscillator light signal to second optical mixer 311. In FIG. 3A, processing logic 331 may drive switching signal 337 to drive optical switch 315 to provide the oscillator light signal to second optical mixer 311 when driving rotating signal 335 to rotate rotating mirror 360 in the second direction since the beam walkoff of the returning beam will be displaced toward second receive optical coupler 307 when rotating mirror 360 is rotated in the second direction.

Since the returning beam is being received by different receive optical couplers depending on the rotation direction of rotating mirror 360, processing logic 331 may be configured to receive first electrical signal 319 from first optical mixer 313 when optical switch 315 is switched to provide the oscillator light signal to first optical mixer 313 (while rotating mirror 360 is rotating in the first direction). Then, processing logic 331 may also be configured to receive second electrical signal 318 from second optical mixer 311 when optical switch 315 is switched to provide the oscillator light signal to second optical mixer 311 (while rotating mirror 360 is rotating in the second direction). Processing logic 331 may receive first electrical signal 319 at input X1 and receive second electrical signal 318 at input X2. First electrical signal 319 may be considered an electrical representation of a first beat signal and second electrical signal 318 may be considered an electrical representation of a second beat signal. First electrical signal 319 and second electrical signal 318 may be processed by LIDAR system 300 to generate one or more images of an external environment (e.g. a scene) of the LIDAR system.

Figure 3B:
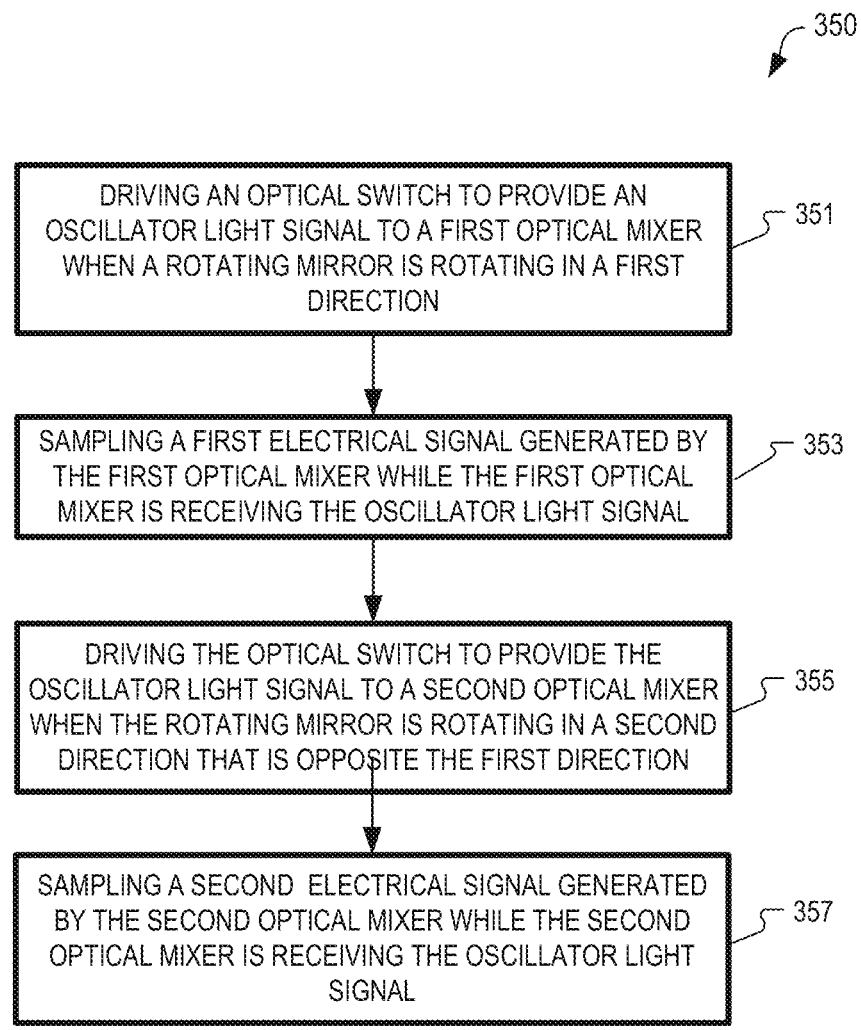
FIG. 3B illustrates a process of selecting a signal while a rotating mirror rotates, in accordance with implementations of the disclosure.

FIG. 3B illustrates a process 350 of selecting a signal while a rotating mirror rotates, in accordance with implementations of the disclosure. The order in which some or all of the process blocks appear in process 350 should not be deemed limiting. Rather, one of ordinary skill in the art having the benefit of the present disclosure will understand that some of the process blocks may be executed in a variety of orders not illustrated, or even in parallel. In some implementations, processing logic 331 may execute all or a portion of process 350.

In process block 351, an optical switch (e.g. optical switch 315) is driven to provide an oscillator light signal to a first optical mixer (e.g. 313) when a rotating mirror is rotating in a first direction.

A first signal (e.g. signal 319) generated by the first optical mixer is sampled while the first optical mixer is receiving the oscillator light signal, in process block 353. The first signal may be sampled by an analog-to-digital converter included in processing logic 331, for example. The first signal may be generated in response to the oscillator light signal and a first receive signal generated by a first receive optical coupler (e.g. first receive optical coupler 309).

In process block 355, the optical switch is driven to provide an oscillator light signal to a second optical mixer (e.g. 311) when the rotating mirror is rotating in a second direction that is opposite the first direction.

A second signal (e.g. signal 318) generated by the second optical mixer is sampled while the second optical mixer is receiving the oscillator light signal, in process block 357. The second signal may be sampled by an analog-to-digital converter included in processing logic 331, for example. The second signal may be generated in response to the oscillator light signal and a second receive signal generated by a second receive optical coupler (e.g. second receive optical coupler 307).

In some implementations of process 350, the rotating mirror is configured to direct a returning beam to the first receive optical coupler and the rotating mirror is also configured to direct the returning beam to the second receive optical coupler. The rotating mirror may be further configured to direct a transmit beam (e.g. transmit beam 305) from a transmit optical coupler (e.g. transmit optical coupler 304) to a target where the returning beam is the transmit beam reflecting off of the target. In some implementations, process 350 may return to process block 351 subsequent to executing process block 357.

Figure 4:
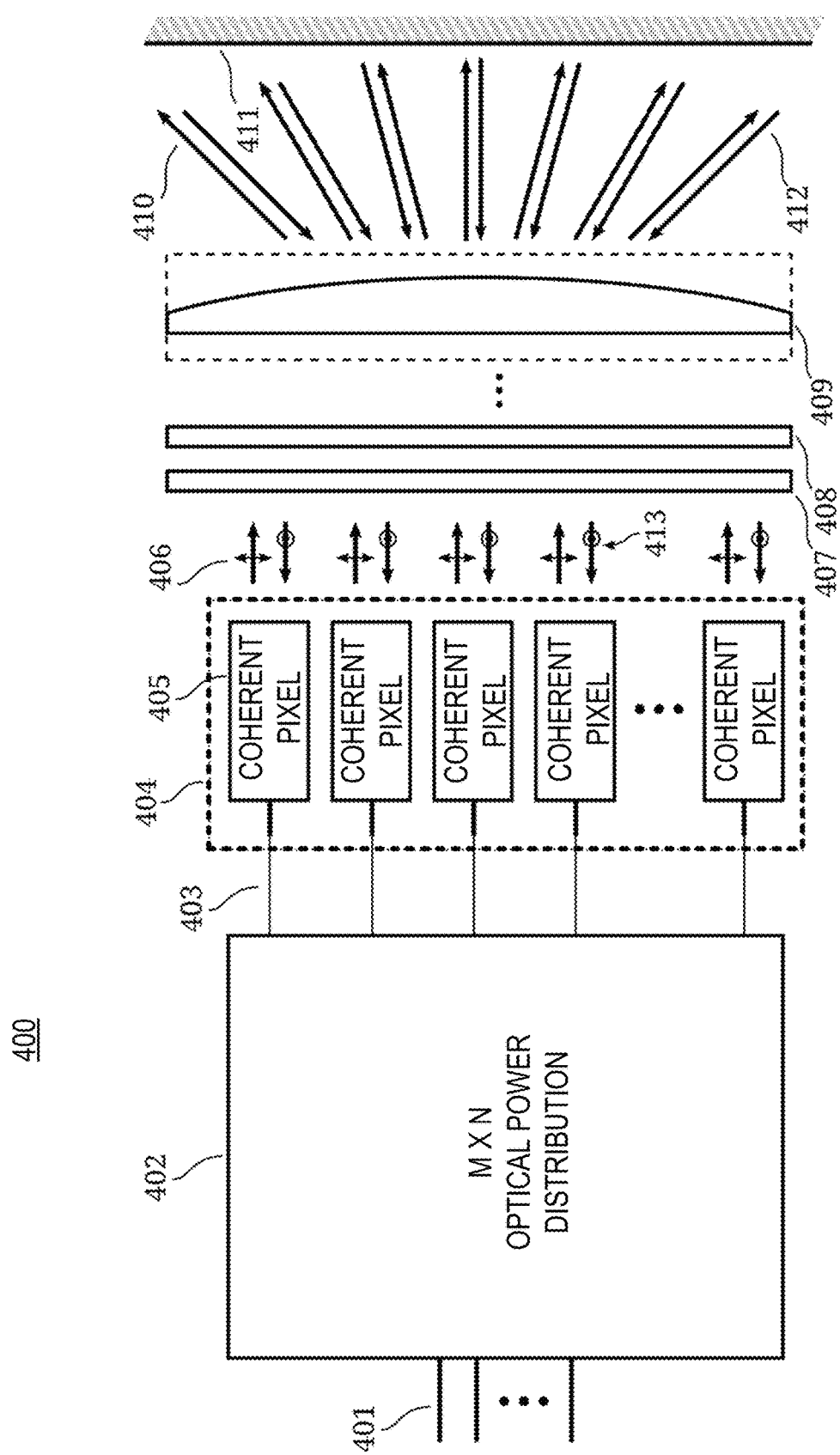
FIG. 4 illustrates how the example coherent pixels depicted in FIGS. 1-3A may be assembled into an array of emitters and receivers to perform parallel FMCW LiDAR measurements, in accordance with implementations of the disclosure.

FIG. 4 illustrates how the example coherent pixels depicted in FIGS. 1-3A may be assembled into an array of emitters and receivers to perform parallel FMCW LiDAR measurements, in accordance with implementations of the disclosure. Input light 401 enters an M×N channel optical power distribution network 402 which routes the input light to one or more of the N optical outputs. This optical power distribution may be active or passive in nature. Each optical output 403 of the distribution network is connected to a coherent pixel 405 which is arranged in an array of pixels 404.

Each coherent pixel 405 emits light in a particular polarization 406 (e.g. TE-polarized light). This beam of light enters the beam displacing optics, 407 and 408, and then passes through a lens 409, which collimates the light and steers it in a desired direction 410. This light may reflect off of a target in the environment 411, producing a returning beam of light 412 propagating back towards the FMCW LiDAR system 400. This beam of light passes back through the lens 409 and then through the beam displacement optics 407 and 408. This returning light may have a component of polarization 413 (e.g. TM-polarized light) which is orthogonal to the transmit polarization which is coupled back into the coherent pixel through an optical path different than the transmitted path as described in FIGS. 1-3A.

Figure 5:
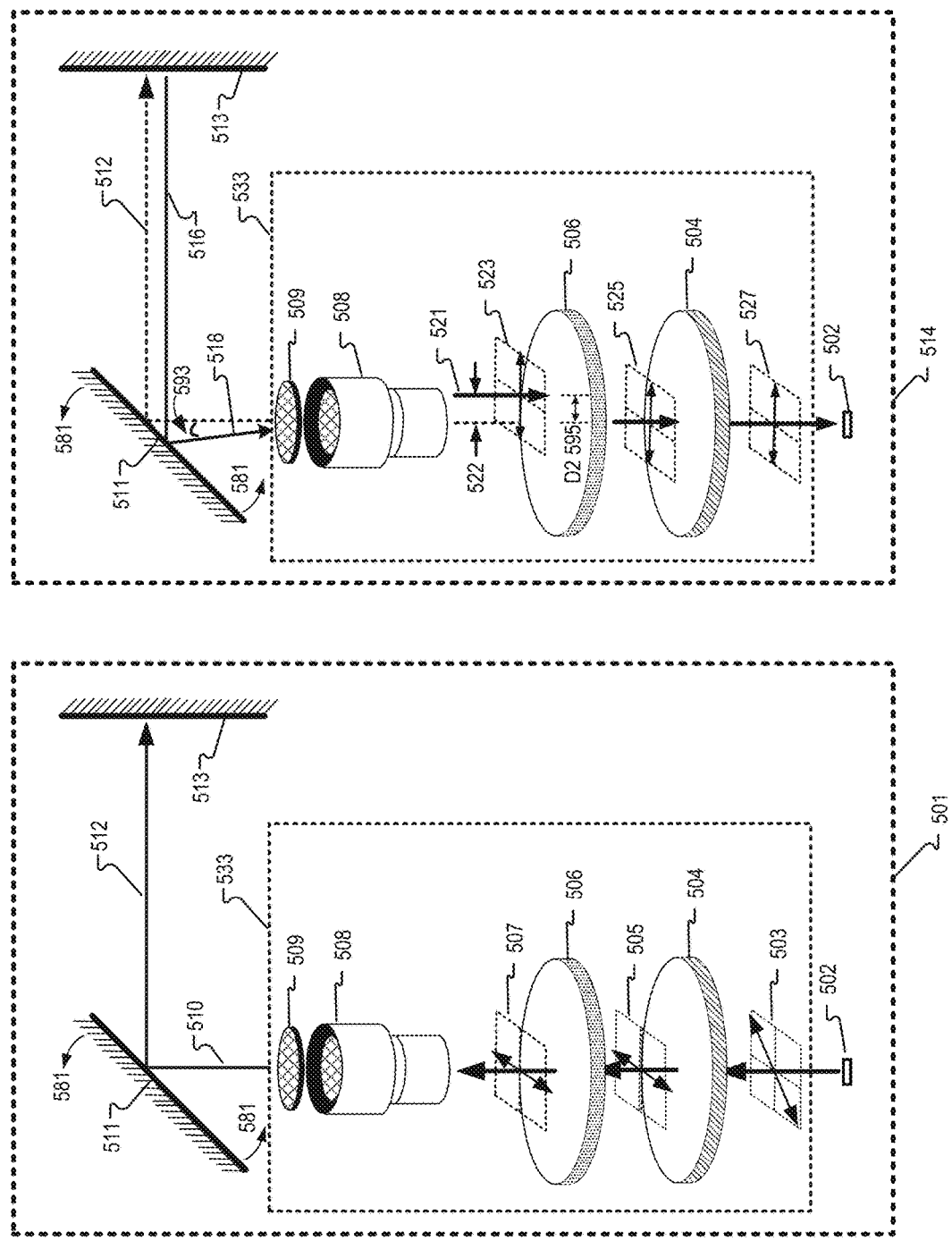
FIG. 5 illustrates an example beam displacement apparatus, in accordance with implementations of the disclosure.

FIG. 5 illustrates an example beam displacement apparatus 533, in accordance with implementations of the disclosure. Example beam displacement apparatus 533 may be used as beam displacement optics 407/408, for example. FIG. 5 shows the basic operation of the beam displacement apparatus for the purpose of beam walkoff correction in FMCW LIDAR. The operation of beam displacement apparatus 533 can be described with respect to transmit path 501 and receive path 514.

In transmit path 501, a coherent pixel 502 emits transmit beam 503 having a particular polarization. Transmit beam 503 may be laser light 101 generated by laser, for example. Transmit beam 503 may be infrared light. In some implementations, transmit beam 503 is near-infrared light. The depicted location of coherent pixel 502 may be co-located with dual-polarization grating coupler 104, in some implementations. In the illustration of FIG. 5, the transmit polarization of transmit beam 503 is 45 degrees, however, this initial polarization can be different in different implementations. Transmit beam 503 propagates through an optional beam rotator 504, which rotates the transmit polarization, depicted by transmit beam 505, such that it is perpendicular to the optical axis of beam displacer element 506. Optional beam rotator 504 can be implemented using a half wave plate or other anisotropic crystal. Beam displacer element 506 is disposed between coherent pixel 502 and rotating mirror 511, in FIG. 5.

After propagating through beam displacer element 506, transmit beam 507 propagates along its original axis and its polarization is unchanged (when compared to the illustration of transmit beam 505). Transmit beam 507 enters lens 508 which is disposed between beam displacer element 506 and rotating mirror 511, in FIG. 5. Lens 508 may collimate the light and steer it in the desired direction. Lens 508 can be implemented using one or more bulk optic lens elements, micro lenses, or thin diffraction gratings. After propagating through lens 508, the light may propagate through an optional waveplate 509 disposed between beam displacement element 506 and rotating mirror 511. Waveplate 509 may be a quarter waveplate configured to shift the polarization axis of incident light by 45 degrees. Therefore, incident linearly polarized light may be converted to circularly polarized light by waveplate 509. Likewise, incident circularly polarized light may be converted to linearly polarized light by waveplate 509. Waveplate 509 may be made of birefringent materials such as quartz, organic material sheets, or liquid crystal, for example.

In the illustrated implementation, this circularly polarized transmit beam 510, reflects off of rotating mirror 511. Rotating mirror 511 may be a continuously rotating mirror that rotates in a particular direction 581 (e.g. counter-clockwise direction 581 in FIG. 5). Rotating mirror 511 is configured to direct the transmit beam 510 to a target 513 in the environment of the LIDAR system or device. Rotating mirror 511 is also configured to direct a returning beam to one or more coherent pixels 502 in receive path 514.

After striking a target in the environment, the transmit beam returns as returning beam 516, as illustrated in receive path 514 of FIG. 5. In other words, returning beam 516 is transmit beam 512 reflecting/scattering off of target 513. Hence, returning beam 516 may have the same wavelength as transmit beam 512.

Returning beam 516 reflecting/scattering off of target 513 propagates back to rotating mirror 511. In the time it took for the light to propagate to target 513 and back, the rotating mirror 511 has rotated by a small amount in direction 581. As a result, the light of returning beam 516 reflects off of rotating mirror 511 at a small angle (reflection angle difference 593) relative to the light propagating along the transmit path 501, as shown by returning beam 518. Returning beam 518 propagates to beam displacement apparatus 533 disposed between coherent pixel 502 and rotating mirror 511. Beam displacement apparatus 533 is configured to introduce a displacement D2 595 to the returning beam to compensate for reflection angle difference 593 between the transmit beam 510 and the returning beam 518 reflecting off of the rotating mirror 511.

Returning beam 518 passes back through quarter waveplate 509. If the target surface maintained the incident polarization, then the returning beam exiting quarter waveplate 509 will result in a linear polarization that is perpendicular to the polarization leaving the lens in the transmit direction. If the target randomized the polarization, then the polarization of the returning beam exiting quarter waveplate 509 includes both the transmit polarization and the perpendicular polarization. This light passes back through the lens 508. Because of the small change in angle of the mirror (reflection angle difference 593), the returning beam enters lens 508 at a small angle, which translates into a small offset, or "beam walkoff" 522 in position of returning beam 521 beneath lens 508 relative to the transmit path 501. A component of this returning beam's polarization orientation 523 will have a non-zero projection onto the optical axis of the beam displacer element 506. This causes the returning beam to be displaced by a fixed displacement amount 595 as it propagates through beam displacer element 506. The beam displacer element 506 parameters (e.g. material, thickness, optical axis orientation) can be chosen to yield a displacement dimension D2 595 that cancels (or at least adjusts for) the beam walkoff for a target at a specified distance. That is, beam displacement element 506 may be configured to compensate for the reflection angle difference 593 between the transmit beam 510 and the returning beam 518 reflecting off of the rotating mirror 511.

In some implementations, beam displacer element 506 includes a birefringent material. In some implementations, the birefringent material may be $LiNO_3$ (Lithium Nitrate). In some implementations, the birefringent material may be $YVO_4$ (Yttrium Orthovanadate). In some implementations, beam displacer element 506 does not include birefringent materials. In FIG. 5, transmit beam 505 has a first polarization orientation as transmit beam 505 encounters beam displacement element 506 and returning beam 523 has a second polarization orientation that is orthogonal to the first polarization orientation of transmit beam 505. The birefringent material of beam displacer element 506 may be selected/configured to introduce displacement dimension D2 595 to the second polarization orientation but not the first polarization orientation.

After passing through beam displacer element 506, the returning beam 525 now propagates along the same axis as the transmit beam but with a perpendicular polarization to the transmit polarization of transmit beam 505. Returning beam 525 propagates through optional beam rotator 504 (that is disposed between coherent pixel 502 and beam displacer element 506) which rotates the polarization by the desired amount to generate returning beam 527 having a polarization orientation that is orthogonal to transmit beam 503. Polarization-diverse coherent pixel 502 is configured to receive returning beam 527.

Figure 6:
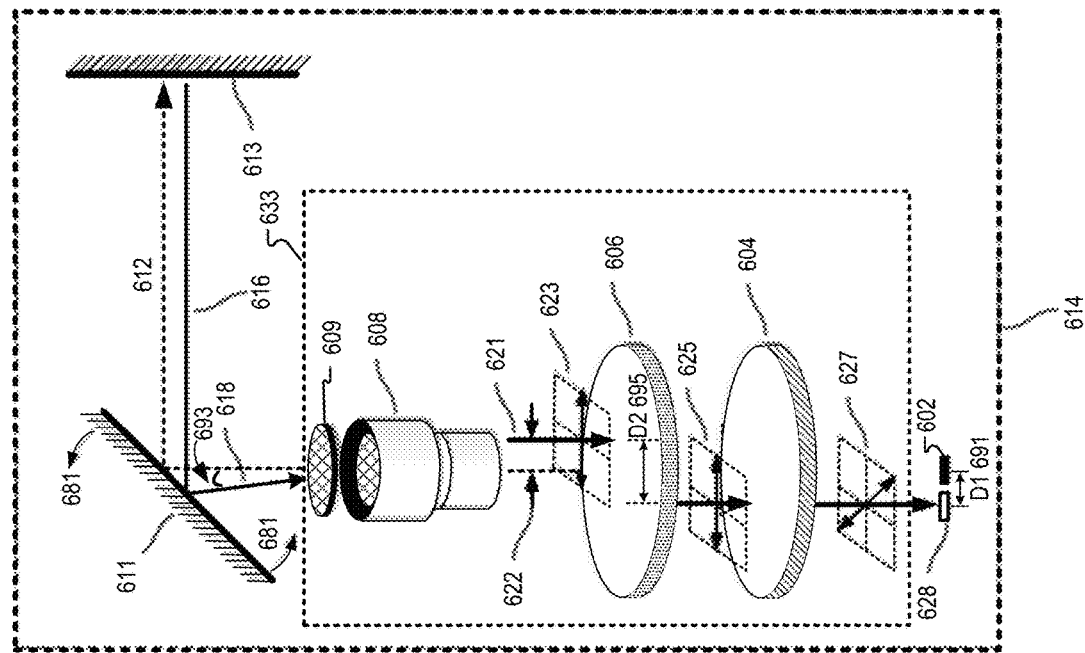
FIG. 6 illustrates an example beam displacement apparatus for non-coaxial operation, in accordance with implementations of the disclosure.
Figure 6:
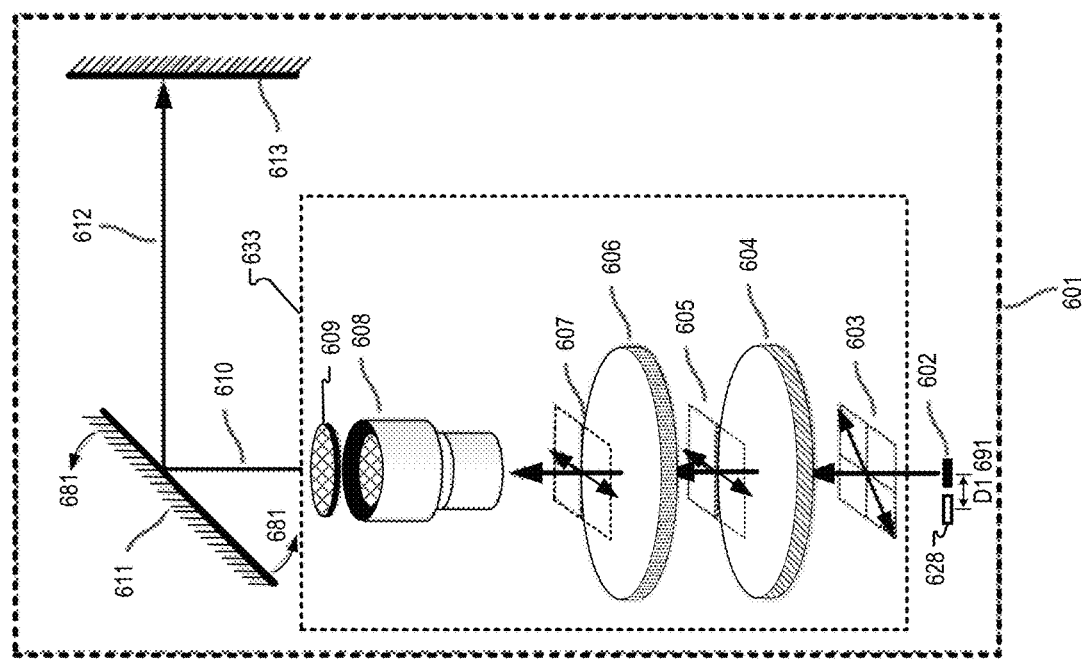

FIG. 6 illustrates an example beam displacement apparatus 633, in accordance with implementations of the disclosure. Example beam displacement apparatus 633 may be used in conjunction with polarization-diverse coherent pixel 212, for example. The components of FIG. 5 may be modified in order to produce a beam offset which is larger than the walkoff such that the returning beam impinges on a different part of the chip than where the transmitted beam is emitted. This allows a different coherent pixel architecture to be used, as described in conjunction with FIG. 2 and FIG. 3. FIG. 6 illustrates the operation of the beam displacement apparatus for the purpose of implementing non-coaxial transmitters and receivers in FMCW LIDAR as well as for correcting beam walkoff. The operation of beam displacement apparatus 633 can be described with respect to transmit path 601 and receive path 614.

In transmit path 601, transmitter 602 emits transmit beam 603 with a particular polarization. Transmit beam 603 may be infrared light. In some implementations, transmit beam 603 is near-infrared light. In the illustration of FIG. 6, the transmit polarization of transmit beam 603 is 45 degrees, however, this initial polarization can be different in different implementations. Transmit beam 603 propagates through an optional beam rotator 604, which rotates the transmit polarization, depicted by transmit beam 605, such that it is perpendicular to the optical axis of beam displacer element 606. Optional beam rotator 604 can be implemented using a half wave plate or other anisotropic crystal. Beam displacer element 606 is disposed between transmitter 602 and rotating mirror 611, in FIG. 6.

After propagating through beam displacer element 606, transmit beam 607 propagates along its original axis and its polarization is unchanged (when compared to the illustration of transmit beam 605). Transmit beam 607 enters lens 608 which is disposed between beam displacer element 606 and rotating mirror 611, in FIG. 6. Lens 608 may collimate the light and steer it in the desired direction. Lens 608 can be implemented using one or more bulk optic lens elements, micro lenses, or thin diffraction gratings. After propagating through lens 608, the light may propagate through an optional waveplate 609 disposed between beam displacement element 606 and rotating mirror 611. Waveplate 609 may be a quarter waveplate configured to shift the polarization axis of incident light by 45 degrees. Therefore, incident linearly polarized light may be converted to circularly polarized light by waveplate 609. Likewise, incident circularly polarized light may be converted to linearly polarized light by waveplate 609. Waveplate 609 may be made of birefringent materials such as quartz, organic material sheets, or liquid crystal, for example.

In the illustrated implementation, this circularly polarized transmit beam 610, reflects off of rotating mirror 611. Rotating mirror 611 may be a continuously rotating mirror that rotates in a particular direction 681 (e.g. counterclockwise direction 681 in FIG. 6). Rotating mirror 611 is configured to direct the transmit beam 610 to a target 613 in the environment of the LIDAR system or device. Rotating mirror 611 is also configured to direct a returning beam to one or more receiving pixels 628 in receive path 614.

After striking a target in the environment, the transmit beam returns as returning beam 616, as illustrated in receive path 614 of FIG. 6. In other words, returning beam 616 is transmit beam 612 reflecting/scattering off of target 613. Hence, returning beam 616 may have the same wavelength as transmit beam 612.

Returning beam 616 reflecting/scattering off of target 613 propagates back to rotating mirror 611. In the time it took for the light to propagate to target 613 and back, the rotating mirror 611 has rotated by a small amount in direction 681. As a result, the light of returning beam 616 reflects off of rotating mirror 611 at a small angle (reflection angle difference 693) relative to the light propagating along the transmit path 601, as shown by returning beam 618. Returning beam 618 propagates to beam displacement apparatus 633 disposed between receiving pixel 628 and rotating mirror 611. Beam displacement apparatus 633 is configured to introduce a displacement D2 695 to the returning beam to compensate for a spacing 691 between transmitter 602 and receiving pixel 628. In FIG. 6, beam displacement apparatus 633 is also configured to compensate for reflection angle difference 693 between the transmit beam 610 and the returning beam 618 reflecting off of the rotating mirror 611.

This light passes back through quarter waveplate 609. If the target surface maintained the incident polarization, then the returning beam exiting quarter waveplate 609 will result in a linear polarization that is perpendicular to the polarization leaving the lens in the transmit direction. If the target randomized the polarization, then the polarization of the returning beam exiting quarter waveplate 609 includes both the transmit polarization and the perpendicular polarization. This light passes back through the lens 608. Because of the small change in angle of the mirror (reflection angle difference 693), the returning beam enters lens 608 at a small angle, which translates into a small offset, or "beam walkoff" 622 in position of returning beam 621 beneath the lens relative to the transmit path. A component of this returning beam's polarization orientation 623 will have a non-zero projection onto the optical axis of the beam displacer element 606. This causes the returning beam to be displaced by a fixed displacement amount 695 as it propagates through beam displacer element 606. The beam displacer element 606 parameters (e.g. material, thickness, optical axis orientation) can be chosen to yield a displacement dimension D2 695 that cancels (or at least adjusts for) the beam walkoff for a target at a specified distance. That is, beam displacement element 606 may be configured to compensate for the reflection angle difference 693 between the transmit beam 610 and the returning beam 618 reflection of the mirror. Furthermore, beam displacement element 606 may be configured to yield displacement dimension D2 695 that also compensates for spacing 691 between the transmitter 602 and receiving pixel 628.

In some implementations, beam displacer element 606 includes a birefringent material. In some implementations, the birefringent material may be $LiNO_3$ (Lithium Nitrate). In some implementations, the birefringent material may be $YVO_4$ (Yttrium Orthovanadate). In some implementations, beam displacer element 606 does not include birefringent materials. In FIG. 6, transmit beam 605 has a first polarization orientation as transmit beam 605 encounters beam displacement element 606 and returning beam 623 has a second polarization orientation that is orthogonal to the first polarization orientation of transmit beam 605. The birefringent material of beam displacer element 606 may be selected/configured to introduce displacement dimension D2 695 to the second polarization orientation but not the first polarization orientation.

In some implementations, after passing through beam displacer element 606, the returning beam 625 now propagates along the same axis as the transmit beam but with a perpendicular polarization to the transmit polarization of transmit beam 605. In some implementations, the returning beam 625 propagates along an axis that is different from the axis of the transmit beam. Returning beam 625 propagates through optional beam rotator 604 (that is disposed between transmitter 602 and beam displacer element 606) which rotates the polarization by the desired amount to generate returning beam 627 having a polarization orientation that is orthogonal to transmit beam 603. Receiving pixel 628 is configured to receive returning beam 627.

Figure 7:
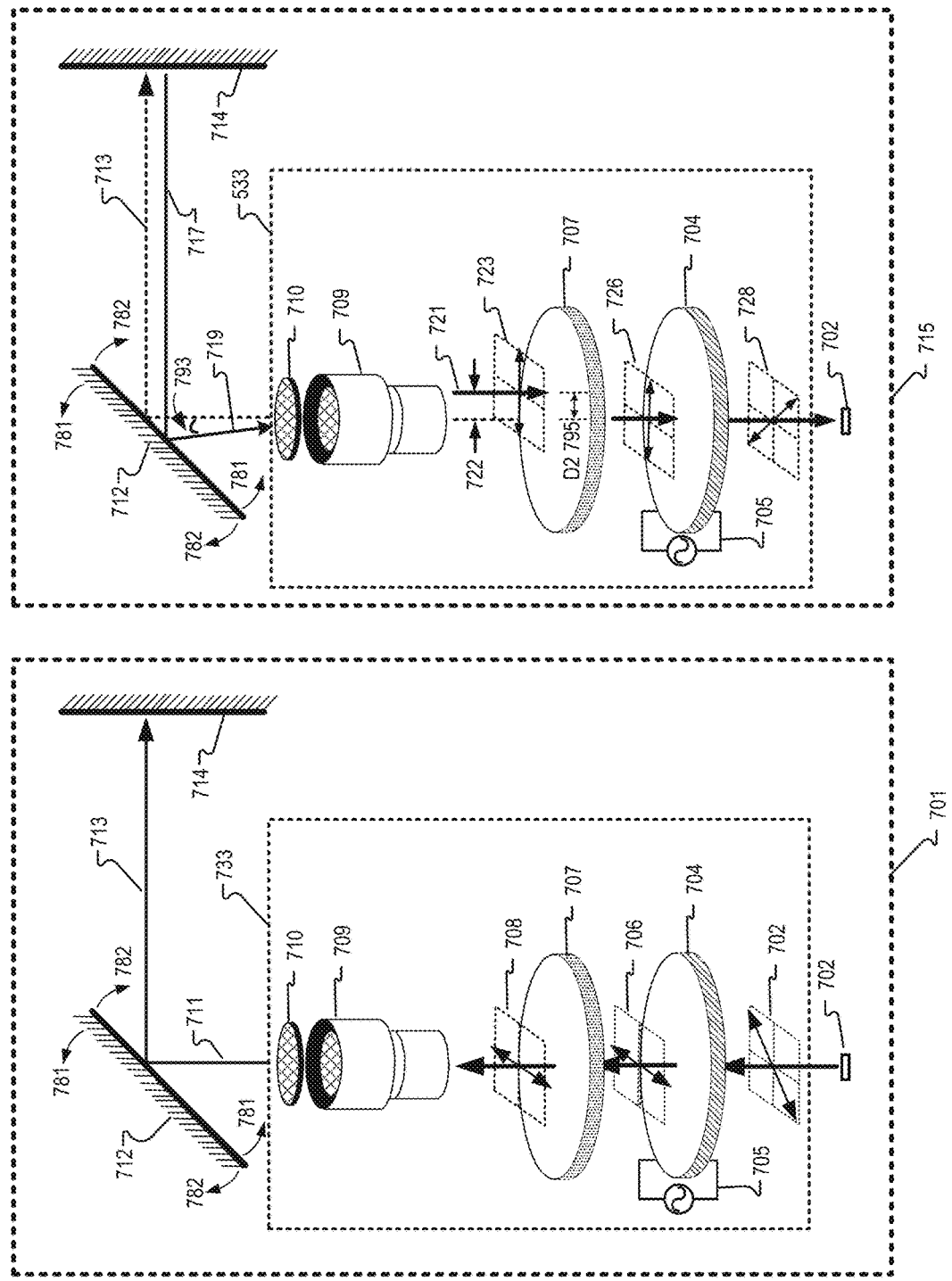
FIG. 7 illustrates an example beam displacement apparatus that includes a switchable beam rotator, in accordance with implementations of the disclosure.

FIG. 7 illustrates an example beam displacement apparatus 733 that includes a switchable beam rotator 704, in accordance with implementations of the disclosure. Switchable beam rotator 704 is configured to change the beam displacement direction in response to electrical signal 705. Switchable beam rotator 704 may be a switchable half waveplate that includes liquid crystals.

FIG. 7 illustrates a variant of beam displacement apparatus 533 except that switchable beam rotator 704 can be controlled using an electrical signal 705. Switchable beam rotator 704 may be driven to a first retardation value (e.g. 0 degrees) when the rotating mirror is rotating in a first direction (e.g. direction 781) and driven to a second retardation value (e.g. 90 degrees) when the rotating mirror is rotating in the second opposite direction (e.g. direction 782). Therefore, the polarization orientation of transmit beam 706 can be changed by 90 degrees dynamically, causing the beam to be displaced in different directions. This is useful in cases where the rotating mirror 712 rotates both clockwise (e.g. direction 782) and counterclockwise (e.g. direction 781) during regular operation (which reverses the walkoff direction).

Figure 8A:
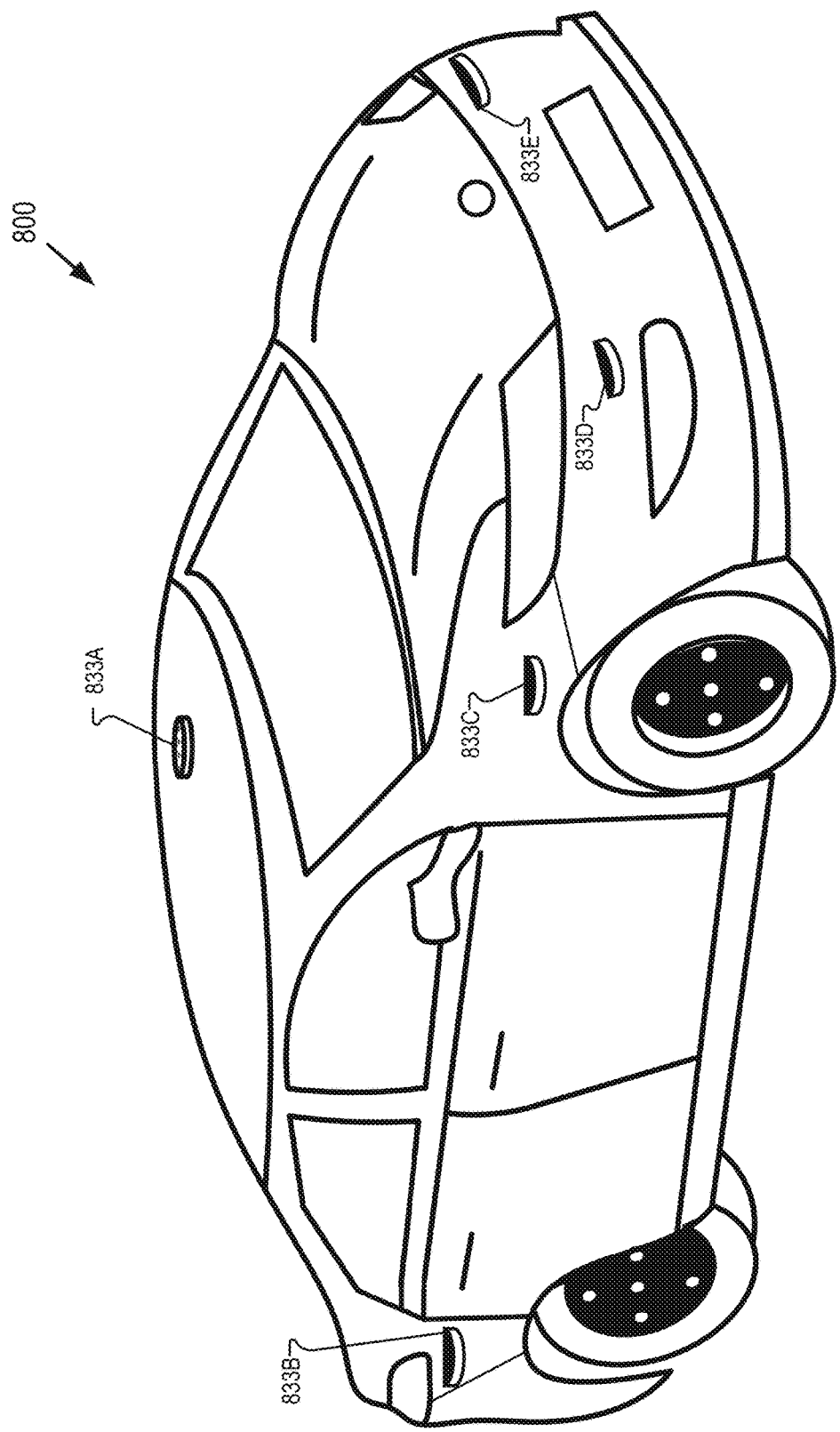
FIG. 8A illustrates an autonomous vehicle including an array of example sensors, in accordance with implementations of the disclosure.
Figure 8B:
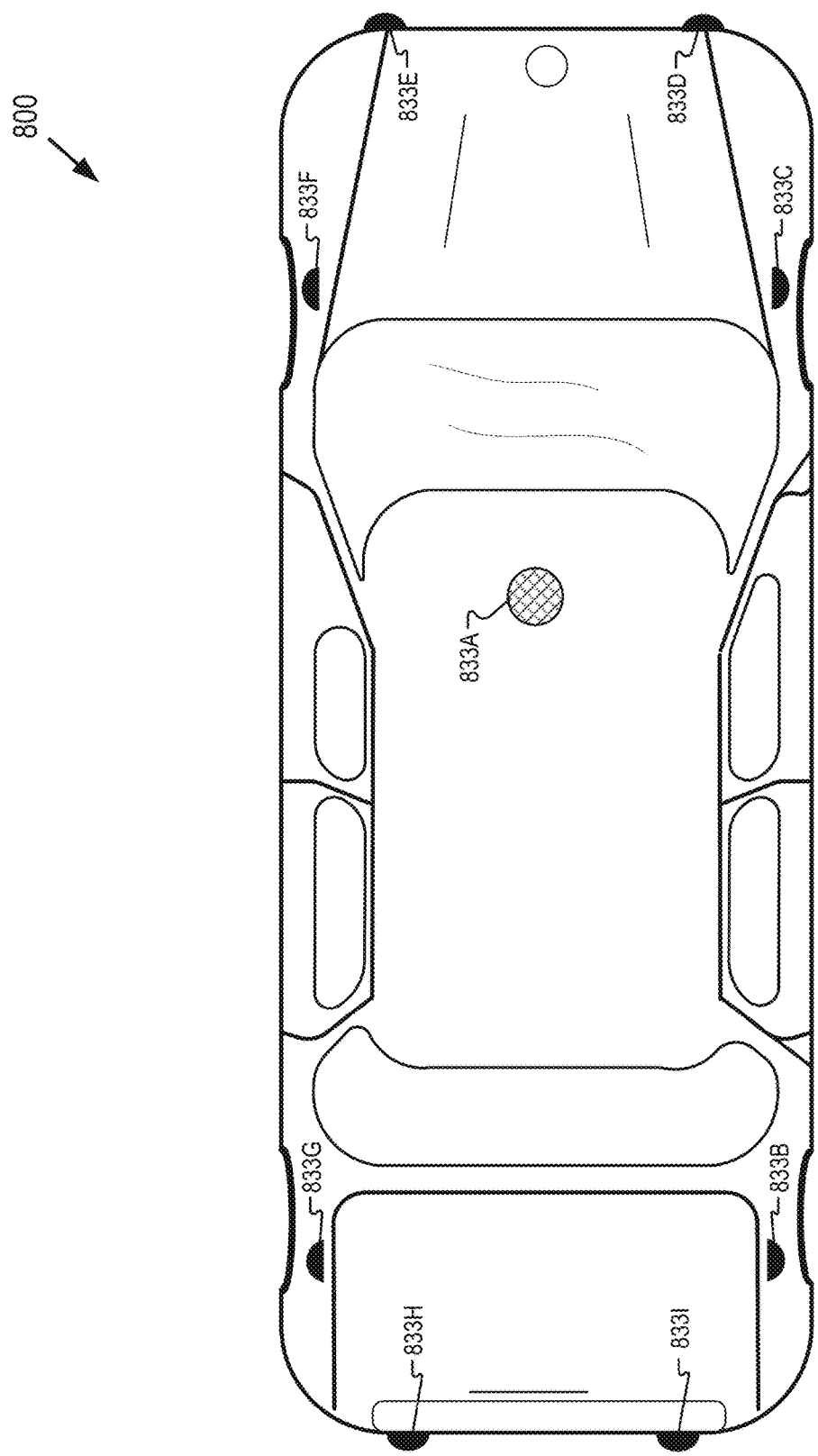
FIG. 8B illustrates a top view of an autonomous vehicle including an array of example sensors, in accordance with implementations of the disclosure.
Figure 8C:
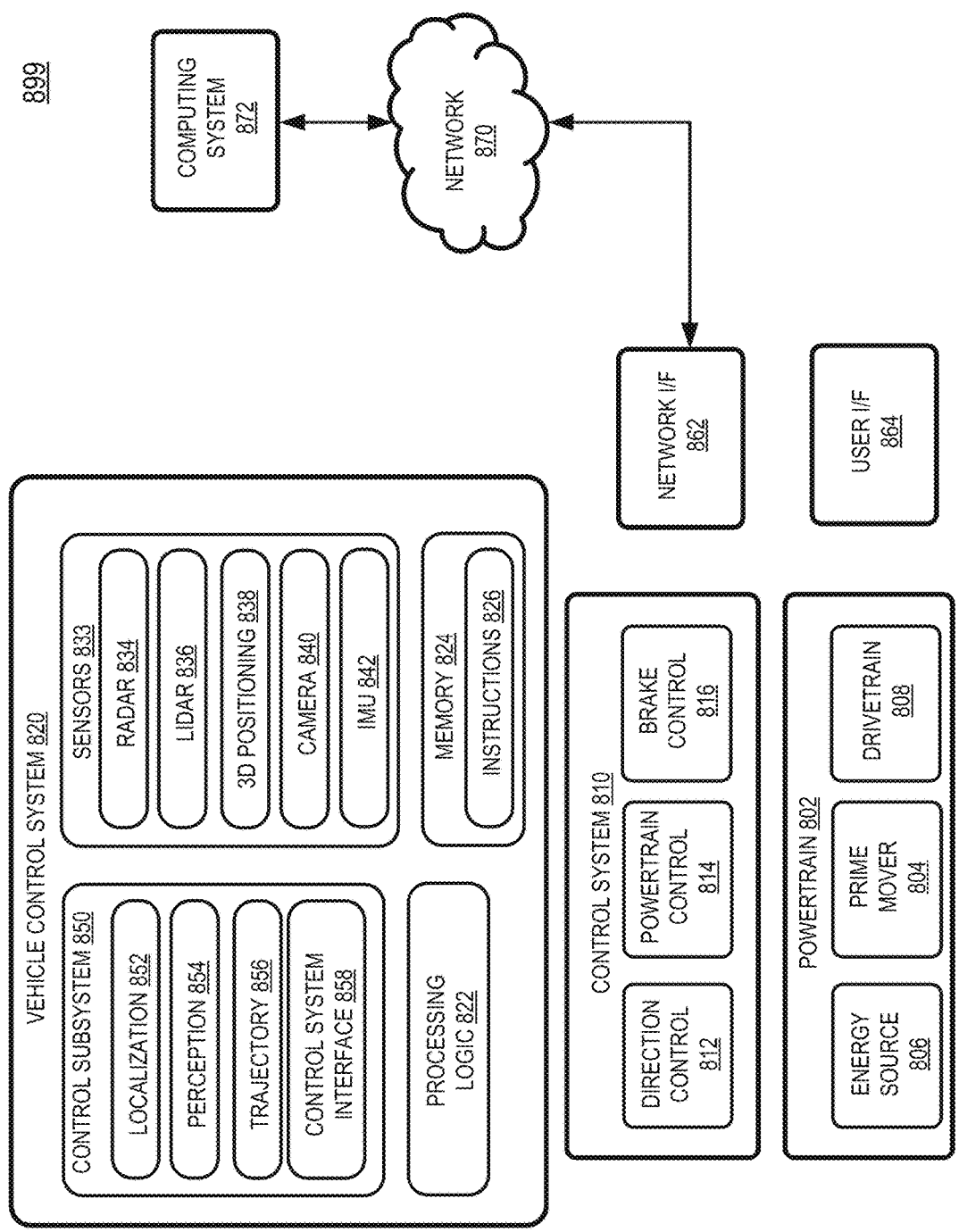
FIG. 8C illustrates an example vehicle control system including sensors, a drivetrain, and a control system, in accordance with implementations of the disclosure.

FIG. 8A illustrates an example autonomous vehicle 800 that may include the LIDAR designs of FIGS. 1-7, in accordance with aspects of the disclosure. The illustrated autonomous vehicle 800 includes an array of sensors configured to capture one or more objects of an external environment of the autonomous vehicle and to generate sensor data related to the captured one or more objects for purposes of controlling the operation of autonomous vehicle 800. FIG. 8A shows sensor 833A, 833B, 833C, 833D, and 833E. FIG. 8B illustrates a top view of autonomous vehicle 800 including sensors 833F, 833G, 833H, and 833I in addition to sensors 833A, 833B, 833C, 833D, and 833E. Any of sensors 833A, 833B, 833C, 833D, 833E, 833F, 833G, 833H, and/or 833I may include LIDAR devices that include the designs of FIGS. 1-7. FIG. 8C illustrates a block diagram of an example system 899 for autonomous vehicle 800. For example, autonomous vehicle 800 may include powertrain 802 including prime mover 804 powered by energy source 806 and capable of providing power to drivetrain 808. Autonomous vehicle 800 may further include control system 810 that includes direction control 812, powertrain control 814, and brake control 816. Autonomous vehicle 800 may be implemented as any number of different vehicles, including vehicles capable of transporting people and/or cargo and capable of traveling in a variety of different environments. It will be appreciated that the aforementioned components 802-816 can vary widely based upon the type of vehicle within which these components are utilized.

The implementations discussed hereinafter, for example, will focus on a wheeled land vehicle such as a car, van, truck, or bus. In such implementations, prime mover 804 may include one or more electric motors and/or an internal combustion engine (among others). The energy source may include, for example, a fuel system (e.g., providing gasoline, diesel, hydrogen), a battery system, solar panels or other renewable energy source, and/or a fuel cell system. Drivetrain 808 may include wheels and/or tires along with a transmission and/or any other mechanical drive components suitable for converting the output of prime mover 804 into vehicular motion, as well as one or more brakes configured to controllably stop or slow the autonomous vehicle 800 and direction or steering components suitable for controlling the trajectory of the autonomous vehicle 800 (e.g., a rack and pinion steering linkage enabling one or more wheels of autonomous vehicle 800 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles). In some implementations, multiple electric motors (e.g., dedicated to individual wheels or axles) may be used as a prime mover.

Direction control 812 may include one or more actuators and/or sensors for controlling and receiving feedback from the direction or steering components to enable the autonomous vehicle 800 to follow a desired trajectory. Powertrain control 814 may be configured to control the output of powertrain 802, e.g., to control the output power of prime mover 804, to control a gear of a transmission in drivetrain 808, thereby controlling a speed and/or direction of the autonomous vehicle 800. Brake control 816 may be configured to control one or more brakes that slow or stop autonomous vehicle 800, e.g., disk or drum brakes coupled to the wheels of the vehicle.

Other vehicle types, including but not limited to off-road vehicles, all-terrain or tracked vehicles, or construction equipment will necessarily utilize different powertrains, drivetrains, energy sources, direction controls, powertrain controls, and brake controls, as will be appreciated by those of ordinary skill having the benefit of the instant disclosure. Moreover, in some implementations some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, autonomous control over autonomous vehicle 800 is implemented in vehicle control system 820, which may include one or more processors in processing logic 822 and one or more memories 824, with processing logic 822 configured to execute program code (e.g. instructions 826) stored in memory 824. Processing logic 822 may include graphics processing unit(s) (GPUs) and/or central processing unit(s) (CPUs), for example. Vehicle control system 820 may be configured to control powertrain 802 of autonomous vehicle 800 in response to the returning beams or in response to signals 319 or 320. Vehicle control system 820 may be configured to control powertrain 802 of autonomous vehicle 800 in response to outputs from a plurality of LIDAR pixels.

Sensors 833A-833I may include various sensors suitable for collecting data from an autonomous vehicle's surrounding environment for use in controlling the operation of the autonomous vehicle. For example, sensors 833A-833I can include RADAR unit 834, LIDAR unit 836, 3D positioning sensor(s) 838, e.g., a satellite navigation system such as GPS, GLONASS, BeiDou, Galileo, or Compass. The LIDAR designs of FIGS. 1-7 may be included in LIDAR unit 836. LIDAR unit 836 may include a plurality of LIDAR sensors that are distributed around autonomous vehicle 800, for example. In some implementations, 3D positioning sensor(s) 838 can determine the location of the vehicle on the Earth using satellite signals. Sensors 833A-833I can optionally include one or more ultrasonic sensors, one or more cameras 840, and/or an Inertial Measurement Unit (IMU) 842. In some implementations, camera 840 can be a monographic or stereographic camera and can record still and/or video images. Camera 840 may include a Complementary Metal-Oxide-Semiconductor (CMOS) image sensor configured to capture images of one or more objects in an external environment of autonomous vehicle 800. IMU 842 can include multiple gyroscopes and accelerometers capable of detecting linear and rotational motion of autonomous vehicle 800 in three directions. One or more encoders (not illustrated) such as wheel encoders may be used to monitor the rotation of one or more wheels of autonomous vehicle 800.

The outputs of sensors 833A-833I may be provided to control subsystems 850, including, localization subsystem 852, trajectory subsystem 856, perception subsystem 854, and control system interface 858. Localization subsystem 852 is configured to determine the location and orientation (also sometimes referred to as the "pose") of autonomous vehicle 800 within its surrounding environment, and generally within a particular geographic area. The location of an autonomous vehicle can be compared with the location of an additional vehicle in the same environment as part of generating labeled autonomous vehicle data. Perception subsystem 854 may be configured to detect, track, classify, and/or determine objects within the environment surrounding autonomous vehicle 800. Trajectory subsystem 856 is configured to generate a trajectory for autonomous vehicle 800 over a particular timeframe given a desired destination as well as the static and moving objects within the environment. A machine learning model in accordance with several implementations can be utilized in generating a vehicle trajectory. Control system interface 858 is configured to communicate with control system 810 in order to implement the trajectory of the autonomous vehicle 800. In some implementations, a machine learning model can be utilized to control an autonomous vehicle to implement the planned trajectory.

It will be appreciated that the collection of components illustrated in FIG. 8C for vehicle control system 820 is merely exemplary in nature. Individual sensors may be omitted in some implementations. In some implementations, different types of sensors illustrated in FIG. 8C may be used for redundancy and/or for covering different regions in an environment surrounding an autonomous vehicle. In some implementations, different types and/or combinations of control subsystems may be used. Further, while subsystems 852-858 are illustrated as being separate from processing logic 822 and memory 824, it will be appreciated that in some implementations, some or all of the functionality of subsystems 852-858 may be implemented with program code such as instructions 826 resident in memory 824 and executed by processing logic 822, and that these subsystems 852-858 may in some instances be implemented using the same processor(s) and/or memory. Subsystems in some implementations may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in vehicle control system 820 may be networked in various manners.

In some implementations, autonomous vehicle 800 may also include a secondary vehicle control system (not illustrated), which may be used as a redundant or backup control system for autonomous vehicle 800. In some implementations, the secondary vehicle control system may be capable of operating autonomous vehicle 800 in response to a particular event. The secondary vehicle control system may only have limited functionality in response to the particular event detected in primary vehicle control system 820. In still other implementations, the secondary vehicle control system may be omitted.

In some implementations, different architectures, including various combinations of software, hardware, circuit logic, sensors, and networks may be used to implement the various components illustrated in FIG. 8C. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), or read-only memories. In addition, each memory may be considered to include memory storage physically located elsewhere in autonomous vehicle 800, e.g., any cache memory in a processor, as well as any storage capacity used as a virtual memory, e.g., as stored on a mass storage device or another computer controller. Processing logic 822 illustrated in FIG. 8C, or entirely separate processing logic, may be used to implement additional functionality in autonomous vehicle 800 outside of the purposes of autonomous control, e.g., to control entertainment systems, to operate doors, lights, or convenience features.

In addition, for additional storage, autonomous vehicle 800 may also include one or more mass storage devices, e.g., a removable disk drive, a hard disk drive, a direct access storage device ("DASD"), an optical drive (e.g., a CD drive, a DVD drive), a solid state storage drive ("SSD"), network attached storage, a storage area network, and/or a tape drive, among others. Furthermore, autonomous vehicle 800 may include a user interface 864 to enable autonomous vehicle 800 to receive a number of inputs from a passenger and generate outputs for the passenger, e.g., one or more displays, touchscreens, voice and/or gesture interfaces, buttons and other tactile controls. In some implementations, input from the passenger may be received through another computer or electronic device, e.g., through an app on a mobile device or through a web interface.

In some implementations, autonomous vehicle 800 may include one or more network interfaces, e.g., network interface 862, suitable for communicating with one or more networks 870 (e.g., a Local Area Network ("LAN"), a wide area network ("WAN"), a wireless network, and/or the Internet, among others) to permit the communication of information with other computers and electronic devices, including, for example, a central service, such as a cloud service, from which autonomous vehicle 800 receives environmental and other data for use in autonomous control thereof. In some implementations, data collected by one or more sensors 833A-833I can be uploaded to computing system 872 through network 870 for additional processing. In such implementations, a time stamp can be associated with each instance of vehicle data prior to uploading.

Processing logic 822 illustrated in FIG. 8C, as well as various additional controllers and subsystems disclosed herein, generally operates under the control of an operating system and executes or otherwise relies upon various computer software applications, components, programs, objects, modules, or data structures, as may be described in greater detail below. Moreover, various applications, components, programs, objects, or modules may also execute on one or more processors in another computer coupled to autonomous vehicle 800 through network 870, e.g., in a distributed, cloud-based, or client-server computing environment, whereby the processing required to implement the functions of a computer program may be allocated to multiple computers and/or services over a network.

Routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter may be described in the context of fully functioning computers and systems, it will be appreciated that the various implementations described herein are capable of being distributed as a program product in a variety of forms, and that implementations can be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs) among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets), it should be appreciated that the invention is not limited to the specific organization and allocation of program functionality described herein.

Those skilled in the art, having the benefit of the present disclosure, will recognize that the exemplary environment illustrated in FIG. 8C is not intended to limit implementations disclosed herein. Indeed, those skilled in the art will recognize that other alternative hardware and/or software environments may be used without departing from the scope of implementations disclosed herein.

The term "processing logic" (e.g. processing logic 331 or 522) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A network may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A light detection and ranging (LIDAR) system comprising:
 a first receive optical coupler;
 a second receive optical coupler;
 a first optical mixer configured to receive a first receive signal from the first receive optical coupler;
 a second optical mixer configured to receive a second receive signal from the second receive optical coupler; and
 an optical switch configured to provide an oscillator light signal, to the first optical mixer in response to a switching signal indicating a first direction of rotation of an optic element, and wherein the optical switch is configured to provide the oscillator light signal to the second optical mixer in response to the switching signal indicating a second direction of rotation of the optic element, wherein the first optical mixer is configured to generate a first electrical signal in response to receiving the oscillator light signal and the first receive signal, and wherein the second optical mixer is configured to generate a second electrical signal in response to receiving the oscillator light signal and the second receive signal.

2. The LIDAR system of claim 1 wherein the optic element comprises:
a rotating mirror configured to rotate in the first direction when the optical switch is switched to provide the oscillator light signal to the first optical mixer, the rotating mirror configured to rotate in the second direction when the optical switch is switched to provide the oscillator light signal to the second optical mixer, wherein the first direction is opposite of the second direction.

3. The LIDAR system of claim 2 further comprising:
processing logic configured to receive a first electrical signal from the first optical mixer when the optical switch is switched to provide the oscillator light signal to the first optical mixer, wherein the processing logic is also configured receive a second electrical signal from the second optical mixer when the optical switch is switched to provide the oscillator light signal to the second optical mixer.

4. The LIDAR system of claim 2, wherein the rotating mirror is configured to direct a returning beam to the first receive optical coupler when the rotating mirror is rotating in the first direction, and wherein the rotating mirror is configured to direct the returning beam to the second receive optical coupler when the rotating mirror is rotating in the second direction.

5. The LIDAR system of claim 1 further comprising:
a transmit optical coupler disposed between the first receive optical coupler and the second receive optical coupler.

6. The LIDAR system of claim 5, wherein the first receive optical coupler is orthogonal to the transmit optical coupler, and wherein the second receive optical coupler is orthogonal to the transmit optical coupler.

7. The LIDAR system of claim 6, wherein the transmit optical coupler is configured to emit a transmit beam having a first polarization orientation, and wherein the first receive optical coupler is configured to receive a second polarization orientation that is orthogonal to the first polarization orientation, and wherein the second receive optical coupler is also configured to receive the second polarization orientation.

8. The LIDAR system of claim 5 further comprising:
a splitter configured to receive laser light, wherein the splitter is configured to provide a first percentage of the laser light to the transmit optical coupler, and wherein the splitter is configured to provide a second percentage of the laser light to the optical switch.

9. The LIDAR system of claim 8, wherein the laser light has an infrared wavelength.

10. A method of operating a light detection and ranging (LIDAR) device, the method comprising:
driving an optical switch to provide an oscillator light signal to a first optical mixer when a rotating mirror is rotating in a first direction;
sampling a first signal generated by the first optical mixer while the first optical mixer is receiving the oscillator light signal;
driving the optical switch to provide the oscillator light signal to a second optical mixer when the rotating mirror is rotating in a second direction that is opposite the first direction; and
sampling a second signal generated by the second optical mixer while the second optical mixer is receiving the oscillator light signal.

11. The method of claim 10, wherein the first signal is generated in response to the oscillator light signal and a first receive signal generated by a first receive optical coupler, and wherein the second signal is generated in response to the oscillator light signal and a second receive signal generated by a second receive optical coupler.

12. The method of claim 11, wherein the rotating mirror is configured to direct a returning beam to the first receive optical coupler, and wherein the rotating mirror is configured to direct the returning beam to the second receive optical coupler.

13. The method of claim 12, wherein the rotating mirror is further configured to direct a transmit beam from a transmit optical coupler to a target, and wherein the returning beam is the transmit beam reflecting off of the target.

14. The method of claim 13, wherein the transmit optical coupler is disposed between the first receive optical coupler and the second receive optical coupler.

15. The method of claim 13, wherein the transmit optical coupler is configured to emit the transmit beam having a first polarization orientation, and wherein the first receive optical coupler is configured to receive a second polarization orientation that is orthogonal to the first polarization orientation, and wherein the second receive optical coupler is also configured to receive the second polarization orientation.

16. The method of claim 11, wherein the oscillator light signal has an infrared wavelength, and wherein the first receive signal and the second receive signal have the infrared wavelength.

17. An autonomous vehicle control system for an autonomous vehicle, the autonomous vehicle control system comprising:
a light detection and ranging (LIDAR) device including:
a first receive optical coupler;
a second receive optical coupler;
a first optical mixer configured to receive a first receive signal from the first receive optical coupler;
a second optical mixer configured to receive a second receive signal from the second receive optical coupler; and
an optical switch configured to provide an oscillator light signal to the first optical mixer in response to a switching signal indicating a first direction of rotation of an optic element, and wherein the optical switch is configured to provide the oscillator light signal to the second optical mixer in response to the switching signal indicating a second direction of rotation of the optic element, wherein the first optical mixer is configured to generate a first electrical signal in response to receiving the oscillator light signal and the first receive signal, and wherein the second optical mixer is configured to generate a second electrical signal in response to receiving the oscillator light signal and the second receive signal; and
one or more processors configured to control the autonomous vehicle in response to the first electrical signal and the second electrical signal.

18. The autonomous vehicle control system of claim 17, wherein the optic element comprises:
a rotating mirror configured to rotate in the first direction when the optical switch is switched to provide the oscillator light signal to the first optical mixer, the rotating mirror configured to rotate in the second direction when the optical switch is switched to provide the oscillator light signal to the second optical mixer, wherein the first direction is opposite of the second direction.

19. The autonomous vehicle control system of claim 18, wherein the LIDAR device further comprises:

processing logic configured to receive a first electrical signal from the first optical mixer when the optical switch is switched to provide the oscillator light signal to the first optical mixer, wherein the processing logic is also configured receive a second electrical signal from the second optical mixer when the optical switch is switched to provide the oscillator light signal to the second optical mixer.

20. The autonomous vehicle control system of claim 18, wherein the rotating mirror is configured to direct a returning beam to the first receive optical coupler, and wherein the rotating mirror is configured to direct the returning beam to the second receive optical coupler.

* * * * *